Nov. 17, 1970     W. W. COOPER IV, ETAL     3,541,004
CLEANING AN ULTRAFILTER WITH AN
ELONGATED, RECIPROCATING, AGITATOR
Filed June 10, 1968

INVENTORS
WILLIAM W. COOPER
RUSSELL W. PIERCE
BY
Crowley, Kiely, & Stevens
ATTORNEY

United States Patent Office 3,541,004
Patented Nov. 17, 1970

3,541,004
CLEANING AN ULTRAFILTER WITH AN ELONGATED, RECIPROCATING, AGITATOR
William W. Cooper IV, Sudbury, and Russell W. Pierce, Hanover, Mass., assignors to Abcor, Inc., Cambridge, Mass., a corporation of Massachusetts
Filed June 10, 1968, Ser. No. 735,757
Int. Cl. B01d 13/00
U.S. Cl. 210—19
10 Claims

ABSTRACT OF THE DISCLOSURE

Residue concentrated on or near the surface of a fluid permeable surface, such as a filter or membrane, is removed by employing a mixer oscillating in a plane parallel to the plane of the surface to pump the fluid parallel to the surface thus providing a shearing action to the surface.

BACKGROUND OF THE INVENTION

Separation processes employing fluid permeable surfaces, such as planar filters, suffer from the problem of diminishing efficiency due to a build up on or near the face of the fluid permeable surface of residue which does not pass the permeable surface. Thus, as the process proceeds, the efficiency drops off, in come cases to a point where little, if any, filtrate passes the permeable surface. The methods employed, heretofore, to prevent such a loss in efficiency have not been entirely satisfactory. Agitation of the mixture to be separated, for example with a rotary stirrer, or by directing the fluid in the direction of the permeable surface do not provide sufficient inhibition against such loss of efficiency. In fact, once a deposit has formed on the surface, it is virtually impossible to dislodge it without dismantling the device and cleaning or by back-washing the permeable surface. Either procedure results in disruption of the separation process.

The problem of efficiency loss is even more pronounced in ultrafiltration processes which are widely utilized, particularly in desalination of sea water or in the fractionation of a protein stream. Such processes employ a semipermeable membrane which is selective to certain materials and which permits the passage of some materials but prevents the passage of others. For example, in the case of protein, the materials are separated on the basis of molecular weight. The materials to be processed are provided to the "upstream" side or feed zone of the membrane. To provide the necessary driving force, a pressure is applied to the material to be processed. The solvent from the solution will pass through the membrane while the ions from the solution or other materials are restrained and the concentration of such solute builds up in the feed zone of the membrane.

As the ultrafiltration process proceeds, however, the efficiency of the system diminishes rapidly similar to the situations with filters. There is a tendency for the membrane surface to become covered with the solute material thus preventing access of the feed to the membrane. In the case of a soluble material such as sodium chloride, this manifests itself as concentration polarization. In the case of less soluble substances, there may be actual precipitation and caking of the material on the membrane. In addition, on protein streams, there appears also to be denaturation associated with this layer buildup. The presence of the driving force in ultrafiltration, of course, aggravates the problem of material deposit on the membrane surface.

In order to restore the original efficiency to the system, it is necessary to stop the ultrafiltration process, dismantle the apparatus, and clean the surface of the membrane of concentrated solute. Such an operation, however, may be time consuming, resulting in considerable loss of time in the use of the ultrafiltration apparatus. During the operation of the membrane, there is a continuing change in the efficiency of the process.

A novel apparatus and method has now been found which is not subject to the deficiencies of the prior art.

SUMMARY OF THE INVENTION

It has now been found that the surface of a fluid permeable surface and, in particular a membrane in an ultrafiltration apparatus, can be cleaned of concentrated matter on or near its face during the operation of the apparatus thus maintaining the normal efficiency of the operation and eliminating downtime for cleaning. The fluid permeable surface is cleaned of such concentrated material by providing agitation of the fluid medium parallel to the surface, on the upstream side, or feed zone, of the surface through the production of violent shearing forces which prevents the formation of the deposited layer, or, if such a layer is formed, floats it away.

The violent shearing effect is achieved by providing at least a first mixing member attached to an elongated shaft parallel to the surface of the filter but in spaced relationship to the surface of the filter. As the mixing member passes through the fluid in an oscillating motion, fluid adjacent to the surface of the fluid permeable surface is set in motion in a direction parallel to the surface with a violent shearing effect, thus providing the aforementioned cleaning to the surface. Since the motion of the fluid is parallel to the fluid permeable surface, unlike prior art cleaning methods, there are no "'dead spots," i.e., no sections of the surface which are not subjected to the cleaning action of the fluid set in motion by the mixing member.

Preferably, the mixing member is fixedly mounted on the shaft and contains a plurality of fluid passageways, more preferably tapered passageways, which extend through the mixing member generally in the direction of the oscillation of the shaft, that is, in the plane parallel to the plane of the filter. The oscillation of the shaft through the liquid results in liquid passing into the larger end of the tapered openings, whereby the liquid is compressed and forced out of the smaller trailing end of the opening and thus being discharged in the opposite direction at a considerably higher speed than the speed of the mixing member. In other words, the holes in the mixing member function as a plurality of venturi tubes, resulting in the material to be processed being in a violently agitated state adjacent to the surface of the membrane.

BRIEF DESCRIPTION OF THE DRAWING

Turning now to the drawings.

DESCRIPTION OF THE PREFERRED EMBODIMENTS

Figure 1:
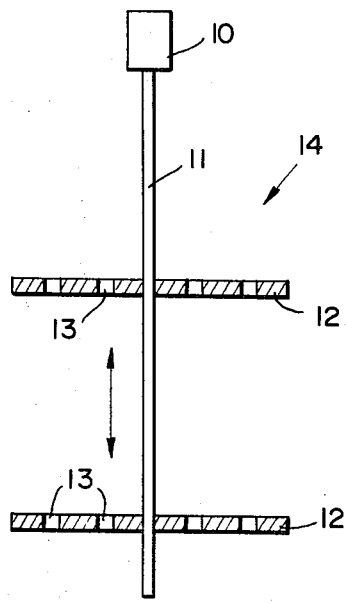
FIG. 1 is a schematic verticle section of a filtering device showing the mixing members and a fluid permeable surface.

FIG. 1 shows the agitation means and its relationship to a fluid permeable surface. Shaft 11 having mixing members 12 affixedly adhered thereto is located adjacent but in spaced relationship to fluid permeable surface 14. Passageways 13 are shown in mixing members 12. Oscillating means 10 are provided to impart the driving force for shaft 11 and oscillation is in the direction of the arrows. Although a single shaft has been shown it should be understood that a plurality of shafts can be used to support the mixing members.

Figure 2:
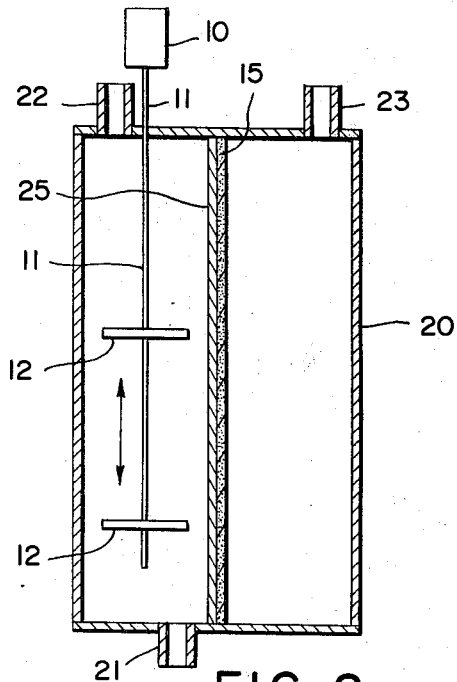
FIG. 2 is a schematic plan view of an apparatus within the scope of the present invention.

FIG. 2 shows an ultrafiltration apparatus within the scope of the present invention comprising housing 20 enclosing a membrane 25 supported in position by porous plate 15. The solution to be processed enters the ultrafiltration apparatus through inlet 21. Outlet 22 is provided to remove the concentrated residue on the upstream side of the membrane. Outlet 23 is provided to remove the permeate which passes through the membrane. On the upstream face of the membrane, the cleaning action is imparted to the surface of the membrane by the action of the mixing members 12 mounted on oscillating shaft 11 which oscillates in the direction of the arrows. Means for driving shaft 10 is shown located outside the ultrafiltration apparatus.

Although the ultrafiltration apparatus is illustrated in a circular, verticle configuration, it should be understood that the fluid permeable surface may be any shape. The fluid permeable surface can also be located in the separation apparatus in a horizontal position or at any angle to the horizontal between 0 and 90°. It is preferred, however, that membranes be mounted in a verticle position to avoid any damage to the membrane as a result of the excessive application of pressure. It is noted, however, that the function of the vibratory cleaning apparatus is as efficient in either the verticle or the horizontal position since the violent agitation of the fluid prevents the settling or even the collection of relatively high concentrations of materials on or near the fluid permeable surface.

It is also preferred that, for the greatest possible efficiency, the agitator be employed adjacent to two fluid permeable surfaces in face to face relationship. Thus a single agitator can provide cleaning to two fluid permeable surfaces simultaneously.

It has also been found that greater efficiency has been found when there is free air space in the feed zone of the separation apparatus.

Figure 3:
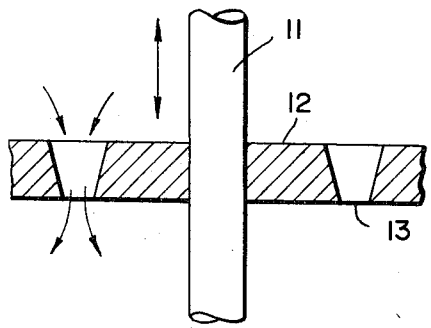
FIG. 3 is a partly schematic fragmentary sectional elevation of a mixing member.

FIG. 3 shows a particularly effective configuration of the agitator wherein mixing member 12 mounted on shaft 11 oscillating through the fluid in the direction of the arrows forces fluid into the wide end of tapered holes 13 from which the fluid is expelled at a greater force and speed from the narrower end.

The taper of the holes in the mixing member may be in the same direction or in opposite directions. For example, the holes may taper inward toward the bottom of the mixing member while others in the same mixing member taper inwards towards the top. By providing a mixing member with holes tapering in opposite directions, a more vigorous circulation in both directions is provided The angle of the taper of the hole is not critical so long as a taper is provided to the hole. However, particularly advantageous results have been achieved when the taper is a 60° angle.

U.S. Pat. No. 2,615,692, provides a description of mixing members suitable for use in the present invention.

Figure 4:
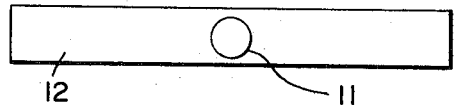
FIGS. 4–8 are various embodiments of mixing members employed in the present invention.

FIG. 4 shows one embodiment of the agitator wherein a solid mixing member 12 is mounted on shaft 11. As member 12 passes back and forth through the fluid, the forces set up in the fluid as it moves in front of and around the member serves to provide the cleaning action on the fluid permeable surface. In a particularly preferred embodiment, the mixing member is flexible, thus bending in the direction away from the direction the member is moving on the shaft.

Figure 5:
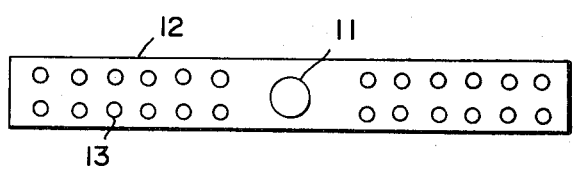

FIG. 5 shows mixing member 12 mounted on shaft 11 having a plurality of passageways 13 therein. As mentioned above, passageways 13 may be tapered or the walls may be straight. The arrangement of the passageways in the mixing member is not critical.

Figure 6:
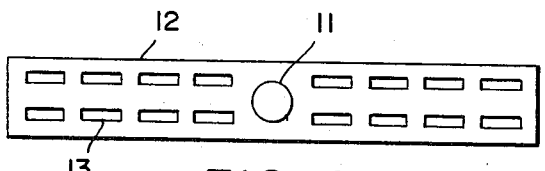

FIG. 6 shows another embodiment of FIG. 5 wherein the passageways 13 are generally rectangular slots.

Figure 7:
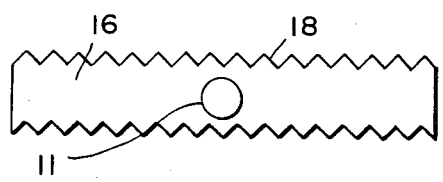

FIG. 7 shows shaft 11 carrying mixing member 12 with notches 18 in a sawtooth configuration on the periphery of said member.

Figure 8:
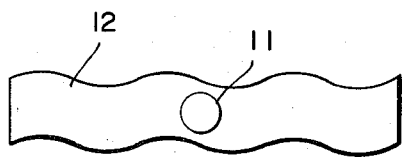

In FIG. 8, the mixing member has a sinusoidal configuration.

The mixing member may be composed of metal, plastic, an impregnated fibrous substrate such as fiber glass or a lamination of one or more of the above materials. The member may be rigid or flexible and need only be sufficiently thick to possess sufficient strength for the particular fluid in which it is employed.

Any electrical or mechanical means such as motors or solenoids can be employed to impart the oscillating force to the shaft. Preferably, the change in direction of the shaft is as violent as possible to provide the greatest degree of agitation and shearing force to the fluid in the area adjacent to the surface of the membrane. The preferred degree of agitation is obtained when the shaft is driven at the resonant frequency of the agitation system.

The mixing member may extend across the entire face of the fluid permeable surface or only a portion thereof. Preferably, the mixing members extend across 75% of the width of the fluid permeable member.

It has been found that the vibratory action provided by the apparatus of the present invention is far superior in cleaning the fluid permeable surface than agitation provided by rotary means, such as conventional stirrers or by forcing fluid against the surface. In such prior art devices, the action is either not severe enough to provide the desired cleaning or the cleaning action sets up "dead spots" where material accumulates on the fluid permeable surface. It is believed that the vibratory cleaning device of the present invention sets up a shearing action across the entire face of the surface which cleans and prevents accumulation of material on the fluid permeable surface.

The novel device of the present invention is suitable for any type of separation operation employing a flat, fluid permeable surface such as a filter or a membrane. In a preferred embodiment, membranes are the fluid permeable materials. The membrane material may be prepared from any suitable film forming polymeric material known to the art such as cellulose esters, cellulose ethers, dinitrofied nitrocellulose, phenol-aldehyde, urea aldehyde, acrylics, polyamides, polyolefins, silicone rubbers, polystyrenes and other elastomers and the like. A particularly preferred class of materials are the cellulose esters, more preferably cellulose acetate and polyion complex resins, e.g., sulfonated polystyrene.

Other examples of membrane materials suitable for use in the present invention are those described in U.S. Pats. Nos. 3,228,876 and 3,228,877, and in "Desalination Membranes From Organic Casting Solutions," I & EC Product Research and Development, vol. 6, page 23, March 1967.

The efficiency of the novel apparatus of the present invention is illustrated by the separation of high molecular weight protein fractions (in excess of 40,000). High molecular weight protein fractions are recovered from fetal calf serum used in nutrient broth by employing an ultrafiltration membrane which retains high molecular weight material while passing lower molecular weight materials such as glucose and metabolic waste products. However, the protein materials retained in the feed zone of the apparatus concentrate at the membrane face and reduce the membrane efficiency essentially to 0. Employing the apparatus of the present invention the throughput of the membrane has been increased as much as 131%. It has also been found that the speed of the oscillation of the agitator is directly proportional to the efficiency of the membrane.

In another embodiment the apparatus is employed in separating protein fractions such as gamma globulin, albumin and lipoproteins from blood. Greater efficiencies are achieved with the apparatus of the present invention than by prior art methods.

What is claimed is:

1. In the method of ultrafiltration of a liquid by a semipermeable membrane in which the membrane is adapted to retain a part of the solution and to pass another part of the solution through the membrane and in which the efficiency of ultrafiltration is diminished by the concentration of solute or residue material on or about the surface of the semipermeable membrane, the improvement which comprises:
 (a) disposing an elongated mixing member across the membrane surface to be cleaned, the mixing member spaced slightly apart from the surface of the membrane; and
 (b) oscillating the mixing member in a short rapid reciprocating movement generally parallel to the membrane surface and spaced slightly apart therefrom to produce a violent and turbulent shearing action in and to the solution adjacent the membrane surface, thereby dislodging and preventing solute residue material from concentrating on or near the membrane surface.

2. The method of claim 1 which includes providing a mixing member which is characterized in being flexible which method includes bending the flexible mixing member in a direction away from the direction the mixing member is moving at that time in its oscillating motion thereby providing a violently agitated state to the liquid solution adjacent the surface of the membrane.

3. The method of claim 1 which includes a plurality of mixing members at least two of said mixing members characterized by containing flow passages therein, the flow passages being tapered in each member in opposite directions, thereby providing a more vigorous circulation of the liquid solution adjacent the surface of the membrane in both directions during oscillation of the mixing members.

4. The method of claim 1 wherein the liquid solution contains a high molecular weight protein fraction, which fraction would normally be retained in the feed zone and concentrate at or on the membrane face.

5. The method of claim 1 wherein the membrane is a generally flat supported membrane composed of a material selected from the group consisting of cellulose esters, cellulose ethers, polyolefins, silicone rubbers, polystyrenes and polyamides, the flat supported membrane material being disposed of essentially vertical position.

6. The method of claim 1 wherein the mixing member is characterized by a plurality of flow passages therein and the method includes continually forcing the liquid solution adjacent to the membrane surface through said flow passages during the rapid oscillation of a mixing member to aid in placing the solution adjacent to the surface membrane in a violently agitated state.

7. The method of claim 6 wherein the flow passages in the mixing member include tapering flow passages and the method includes forcing a portion of the liquid solution adjacent the surface membrane into a larger end of the tapered flow passage of the mixing member and forcing a part of the liquid solution out of the smaller end of the tapered flow passages at a higher speed than the speed of the oscillating mixing member during the rapid oscillation of the mixing member thereby providing a violently agitated state to the liquid solution adjacent the surface of the membrane to be cleaned.

8. The method of claim 1 which includes shaping the periphery of the elongated mixing member in a nonlinear manner to aid in providing a violently agitated state to the liquid solution on oscillation.

9. The method of claim 8 which includes providing a sinusoidal configuration to the periphery of the elongated mixing member.

10. The method of claim 8 which includes providing a sawtooth configuration to the periphery of the mixing member.

References Cited

UNITED STATES PATENTS

| | | | |
|---|---|---|---|
| 2,692,854 | 10/1954 | Henley | 210—415 |
| 3,148,141 | 9/1964 | Schonenberger et al. | 210—23 X |
| 3,276,996 | 10/1966 | Lazare | 210—22 |
| 3,425,562 | 2/1969 | Hamer | 210—321 |

FOREIGN PATENTS

| | | |
|---|---|---|
| 548,246 | 11/1957 | Canada. |
| 979,920 | 12/1950 | France. |

REUBEN FRIEDMAN, Primary Examiner

F. A. SPEAR, JR., Assistant Examiner

U.S. Cl. X.R.

210—23, 79, 321, 414